US012639784B2

(12) United States Patent
Han et al.

(10) Patent No.: US 12,639,784 B2
(45) Date of Patent: May 26, 2026

(54) IMAGE INTERPOLATION METHOD AND IMAGE FUSION METHOD

(71) Applicant: ICATCH TECHNOLOGY, INC., Hsinchu County (TW)

(72) Inventors: Hsin-Pei Han, Hsinchu County (TW); Chia-Ying Tsai, Hsinchu County (TW); Cheng-Yu Wu, Hsinchu County (TW)

(73) Assignee: ICATCH TECHNOLOGY, INC., Hsinchu County (TW)

( * ) Notice: Subject to any disclaimer, the term of this patent is extended or adjusted under 35 U.S.C. 154(b) by 118 days.

(21) Appl. No.: 18/619,195

(22) Filed: Mar. 28, 2024

(65) Prior Publication Data

US 2025/0029205 A1 Jan. 23, 2025

Related U.S. Application Data

(60) Provisional application No. 63/527,346, filed on Jul. 18, 2023.

(51) Int. Cl.
| | |
|---|---|
| *G06T 3/4015* | (2024.01) |
| *G06T 5/73* | (2024.01) |
| *H04N 23/73* | (2023.01) |
| *H04N 23/84* | (2023.01) |

(52) U.S. Cl.
CPC .............. *G06T 3/4015* (2013.01); *G06T 5/73* (2024.01); *H04N 23/73* (2023.01); *H04N 23/843* (2023.01); *G06T 2207/10024* (2013.01); *G06T 2207/10048* (2013.01); *G06T 2207/20221* (2013.01)

(58) Field of Classification Search
CPC .... H04N 23/73; H04N 23/843; G06T 3/4015; G06T 5/73; G06T 5/50; G06T 2207/10024; G06T 2207/10048; G06T 2207/20221
See application file for complete search history.

(56) References Cited

U.S. PATENT DOCUMENTS

| | | | | |
|---|---|---|---|---|
| 8,743,226 B2 * | 6/2014 | Lee | ........................ | H04N 23/71 |
| | | | | 348/216.1 |
| 2017/0374299 A1 * | 12/2017 | Liu | ............................ | G06T 5/50 |
| 2020/0221037 A1 * | 7/2020 | Lu | ............................. | H04N 9/77 |

FOREIGN PATENT DOCUMENTS

| | | | | | |
|---|---|---|---|---|---|
| CN | 102778201 | A | | 11/2012 | |
| CN | 104539919 | A * | 4/2015 | | |
| CN | 114765666 | A * | 7/2022 | ............. | H04N 23/70 |
| CN | 112991493 | B * | 7/2023 | ............. | G06T 11/40 |
| TW | 201103309 | A1 | 1/2011 | | |
| WO | WO-2017202061 | A1 * | 11/2017 | ............. | H04N 23/73 |
| WO | WO-2022261550 | A1 * | 12/2022 | ............. | G06T 11/10 |

* cited by examiner

*Primary Examiner* — Lin Ye
*Assistant Examiner* — Steven Daniel Barry
(74) *Attorney, Agent, or Firm* — Winston Hsu

(57) ABSTRACT

An image interpolation method comprises applying a filter to an RGBIR image to generate a LUMA image; calculating two gradients according to the LUMA image; and interpolating a missing pixel between two pixels in the RGBIR image according to the two gradients. Wherein each gradient corresponding to two LUMA pixels in the LUMA image. An image fusion method comprises applying a filter to an RGBIR image to generate a LUMA image; obtaining an R-image, a G-image, a B-image and an IR image according to the RGBIR image; and generating a fusion image according to the R-image, G-image, B-image, the IR image and the LUMA image.

17 Claims, 13 Drawing Sheets

Apply a filter to an RGBIR image to generate a LUMA image — S100

Calculate gradients according to the LUMA image — S200

Interpolate the missing pixels in the RGBIR image according to the gradients — S300

Obtain an interpolated image — S400

F5

$$\begin{bmatrix} 0 & 1 & 2 & 1 & 0 \\ 1 & 4 & 6 & 4 & 1 \\ 2 & 6 & 8 & 6 & 2 \\ 1 & 4 & 6 & 4 & 1 \\ 0 & 1 & 2 & 1 & 0 \end{bmatrix} / 64$$

IMAGE INTERPOLATION METHOD AND IMAGE FUSION METHOD

CROSS REFERENCE TO RELATED APPLICATIONS

This application claims the benefit of U.S. Provisional Application No. 63/527,346, filed on Jul. 18, 2023. The content of the application is incorporated herein by reference.

BACKGROUND OF THE INVENTION

1. Field of the Invention

The invention relates to image processing, and in particular, to an image interpolation method and an image fusion method.

2. Description of the Prior Art

Since an RGBIR image sensor has IR pixels, the RGBIR image sensor can detect near infrared (IR) light and has better performance in lower light scenarios. However, since the 4*4 pattern RGBIR image sensor has fewer R and B pixels than a traditional RGB Bayer pattern image sensor, the interpolation for a complete RGB image is more difficult. The proportion of R pixels, B pixels and G pixels in the 4*4 range of the traditional RGB Bayer pattern image sensor is 25%, 25% and 50% respectively, but the proportion of R pixels, B pixels and G pixels in the 4*4 range of the 4*4 pattern RGBIR image sensor is 12.5%, 12.5% and 50% respectively. The quantities of R pixels and B pixels of the 4*4 pattern RGBIR image sensor are only half of those of the RGB Bayer pattern image sensor, making it more difficult to restore the complete information of R and B channel for a 4*4 pattern RGBIR image.

The prior art uses a complex high pass filter to calculate a LUMA image as a reference for interpolating the RGBIR image. Since the calculation is complicated, the calculation cost is high.

Another method in the prior art is to directly average the pixels of the same color within a 5*5 range in the RGBIR image to interpolate the missing pixels. While the calculation is simple, this method may result in blurred images and artifact issues.

Further, image fusion is needed for an RGB image that is too dark to see image details in low light situation. To solve this problem, by fusing an IR image with an RGB image, the image details may be enhanced.

The prior art use only RGB and IR information separately for image fusion and may cause RGB and IR unbalance and visual unpleasing results.

SUMMARY OF THE INVENTION

According to an embodiment of the invention, an image interpolation method includes applying a filter to an RGBIR image to generate a LUMA image directly from the RGBIR image, calculating two gradients according to the LUMA image, and interpolating a missing pixel between two pixels in the RGBIR image according to the two gradients. Each gradient corresponds to two LUMA pixels in the LUMA image.

According to another embodiment of the invention, an image fusion method includes applying a filter to an RGBIR image to generate a LUMA image, obtaining an R-image, a G-image, a B-image and an IR image according to the RGBIR image, and generating a fusion image according to the R-image, G-image, B-image, the IR image and the LUMA image.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 shows a schematic diagram of an RGBIR image.

FIG. 3 shows a schematic diagram of a filter.

FIG. 5 shows a schematic diagram of overlapping the filter with an RGBIR image to define a working field in an RGBIR image according to an embodiment of the present invention.

DETAILED DESCRIPTION

Figure 1:
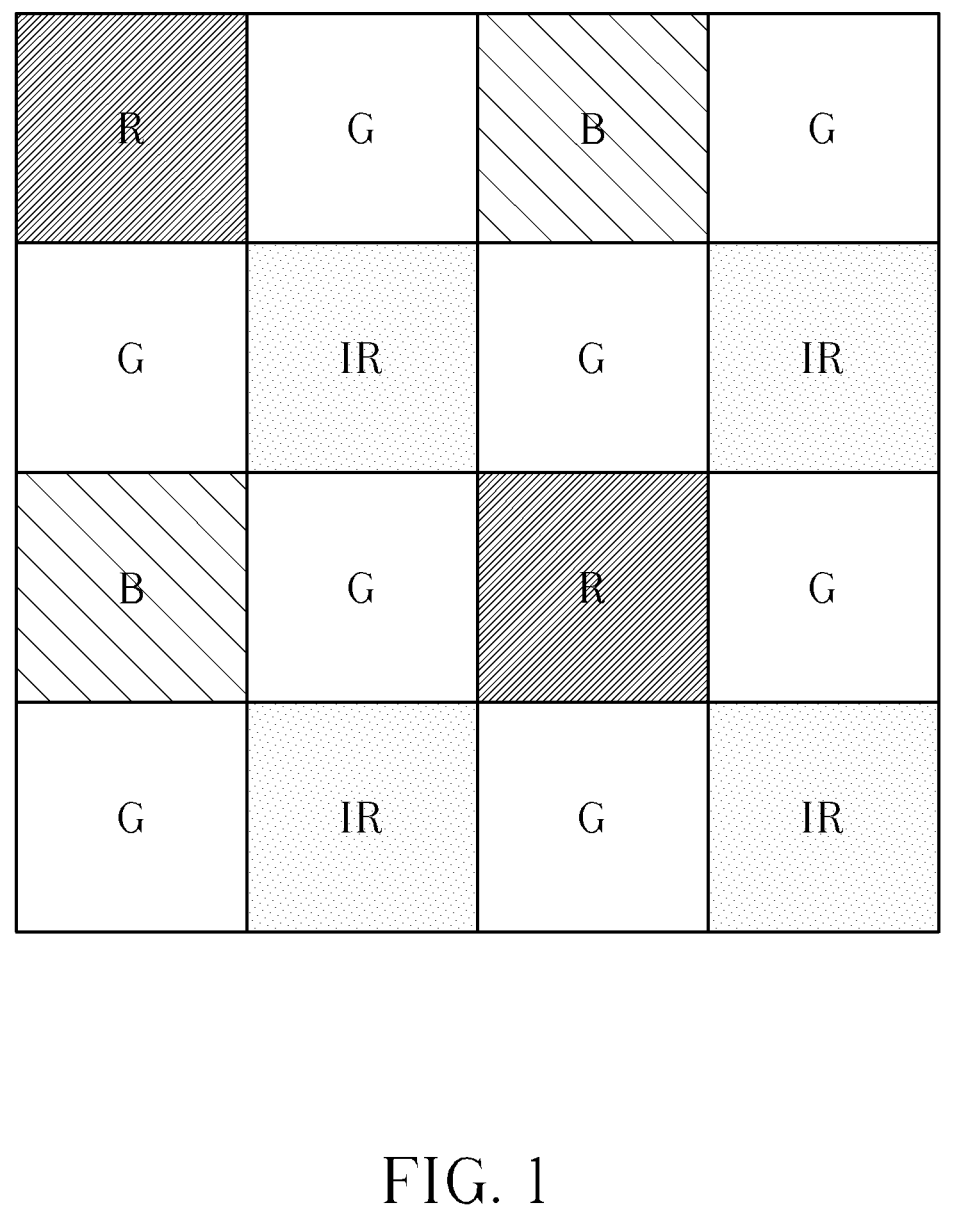

FIG. 1 shows a schematic diagram of an RGBIR image. As shown in FIG. 1, an RGBIR image comprises R pixels, B pixels G pixels and IR pixels. The proportion of R pixels, B pixels, G pixels and IR pixels in the 4*4 range of the 4*4 pattern RGBIR image is 12.5%, 12.5%, 50% and 25% respectively. To obtain a complete R-image, a complete G-image, a complete B-image and a complete IR-image, the missing pixels need to be generated by interpolation.

The complete G-image, a complete B-image and a complete IR-image may be displayed in a display system. The display system may perform an image interpolation method and/or an image fusion method to generate the complete G-image, a complete B-image and a complete IR-image, and may include a display device and a processor coupled to each other. The display device may be a liquid crystal display, a camera display, or other types of displays. The processor may be a central processing unit, a graphics processing unit, a digital signal processor, a microprocessor, an application specific integrated circuit, or others.

Figure 2:
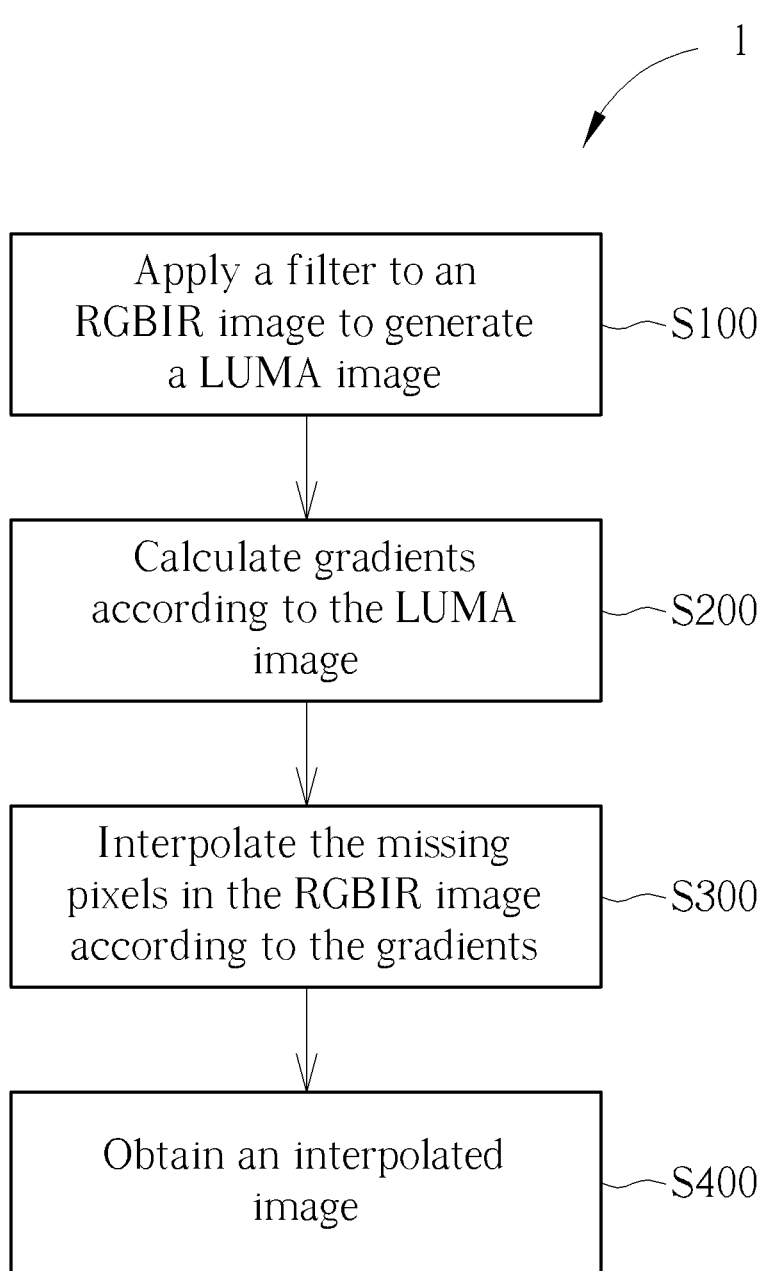
FIG. 2 shows a flowchart of an image interpolation method according to an embodiment of the present invention.

FIG. 2 shows a flowchart of an image interpolation method 1 according to an embodiment of the present invention. The image interpolation method 1 includes Steps S100 to S400. Any reasonable step change or adjustment is within the scope of the disclosure. Steps S100 to S400 are explained as follows:

Step S100: Apply a filter to an RGBIR image to generate a LUMA image;

Step S200: Calculate gradients according to the LUMA image;

Step S300: Interpolate the missing pixels in the RGBIR image according to the gradients;

Step S400: Obtain an interpolated image.

In Step 100, the processor applies a filter to an RGBIR image to generate a LUMA image. The LUMA image may be generated directly from the RGBIR image with a single filter. The filter is a two-dimensional matrix of (N*N) coefficients, N being a positive odd integer, and the sum of the coefficients of the two-dimensional matrix is 1. The coefficients in the filter may be symmetric or asymmetric. The examples of the filter may refer to FIG. 3 and the details of Step S100 may refer to FIG. 4.

FIG. 3 shows a schematic diagram of a filter. The filter is a two-dimensional matrix of size N*N, N being a positive odd integer. FIG. 3 shows the examples of the filter for N being 5. The filter F5 is a two-dimensional matrix of (5*5) coefficients. A coefficient in the filter F5 is a number in the matrix divided by the divisor. Each number in the filter F5 needs to be divided by a divisor so the sum of all coefficients in the filter F5 is 1. For the simplicity of the diagram, the divisor is outside the matrix to make it easier to read. As shown in FIG. 3, each number in the matrix of the filter F5 needs to be divided by 64 so the sum of all the coefficients of the filter F5 is 1. For example, the number of the first row and the second column of the filter F5 is 1, the coefficient at the first row and the second column of the filter F5 is 1/64. As shown in FIG. 3, the divisor is the sum of all numbers in a matrix of the filter. For example, the sum of all numbers in the matrix of the filter F5 is 64 (=0+1+2+1+0+1+4+6+4+ 1+2+6+8+6+2+1+4+6+4+1+0+1+2+1+0). By dividing each number in the matrix of the filter F5 by the divisor, the coefficients of the filter F5 may be summed up to a total of 1. The filter in FIG. 3 is for illustration only, and is not limited thereto.

Figure 4:
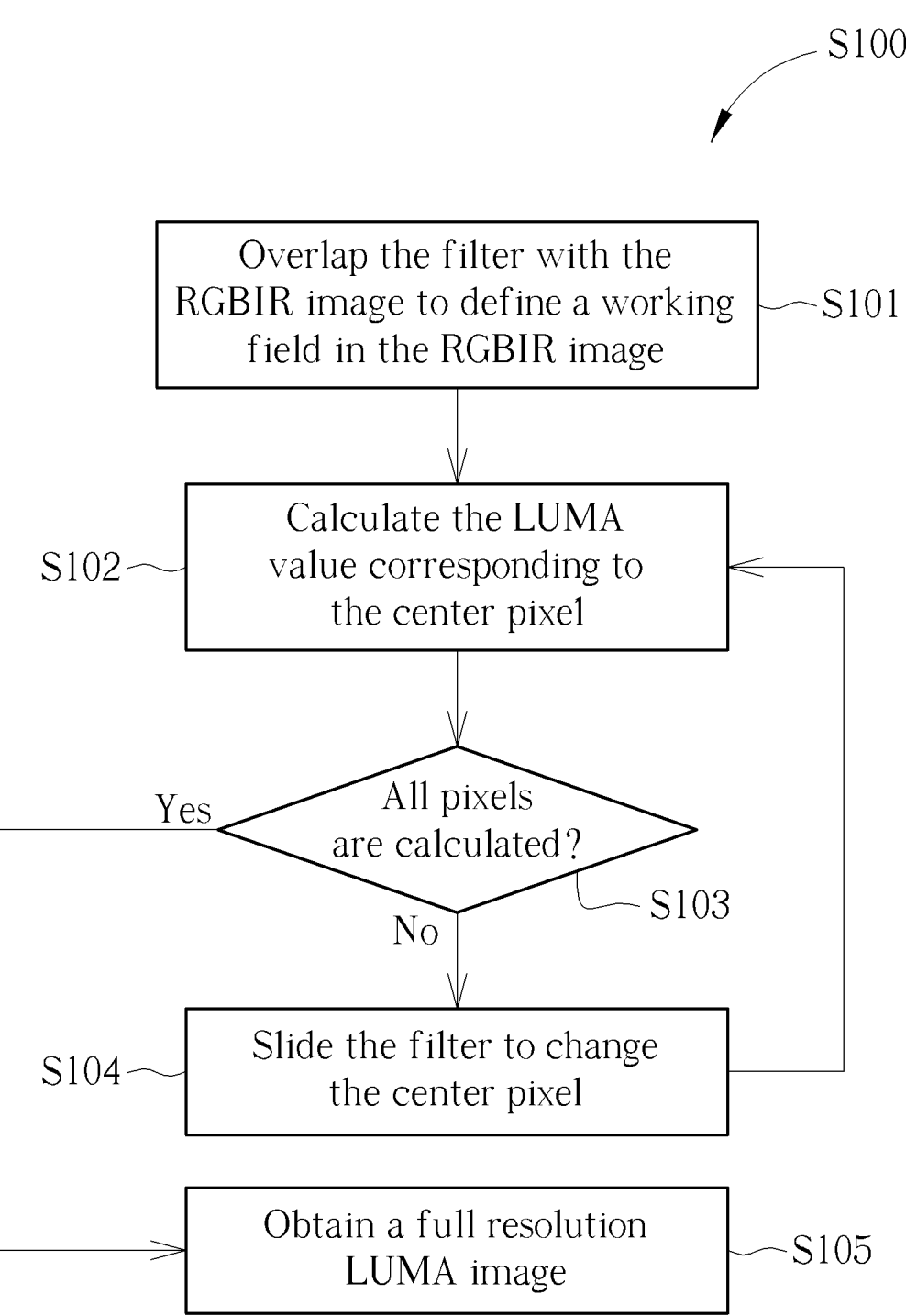
FIG. 4 shows a flowchart of Step S100 of the image interpolation method in FIG. 2.

FIG. 4 shows a flowchart of Step S100 of the image interpolation method 1 in FIG. 2. Step S100 includes Steps S101 to S105. Any reasonable step change or adjustment is within the scope of the disclosure. Steps S101 to S105 are explained as follows:

Step S101: Overlap the filter with the RGBIR image to define a working field in the RGBIR image;

Step S102: Calculate the LUMA value corresponding to the center pixel;

Step S103: Determine if all pixels in the RGBIR image are calculated; if not, perform Step 104; if so, perform Step S105;

Step S104: Slide the filter to change the center pixel; Step S105: Obtain a full resolution LUMA image.

Figure 5:
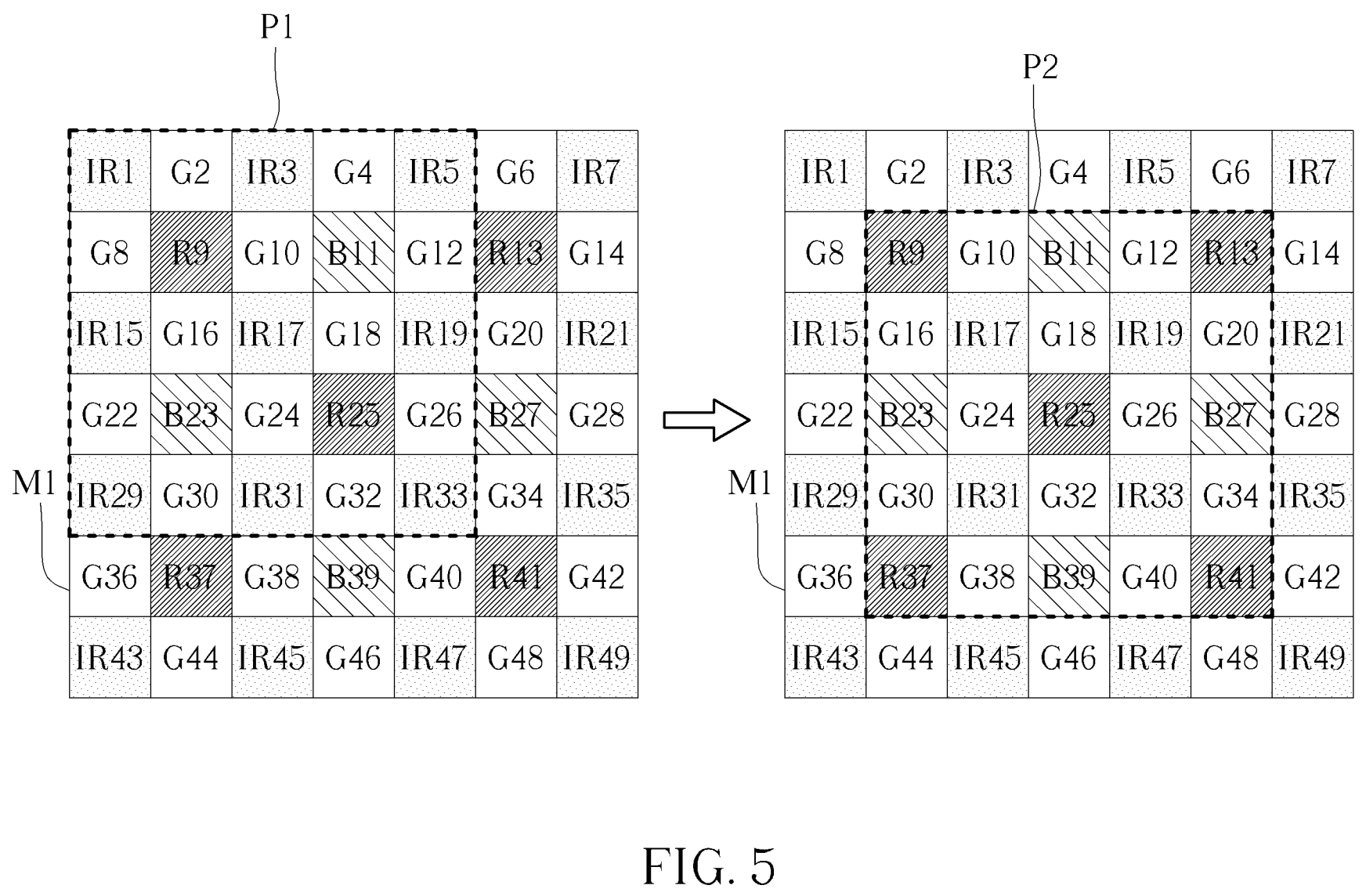

The example of Step S101 may refer to FIG. 5. FIG. 5 shows a schematic diagram of overlapping the filter with an RGBIR image to define a working field in an RGBIR image according to an embodiment of the present invention. The filter is a two-dimensional matrix of size N*N, N being a positive odd integer. In FIG. 5, taking the filter F5 in FIG. 3 as an example, when the processor performs Step S101, overlap the filter F5 with the RGBIR image M1 to define a 5*5 working field in the RGBIR image M1. The working field is the area surrounded by the dotted line. The filter F5 may be slid to change the working field in the RGBIR image M1. After sliding the filter, the center point of the filter F5 is still on the RGBIR image M1.

In Step S102, the processor calculates the LUMA value corresponding to the center pixel, wherein the center pixel is the pixel in the RGBIR image corresponding to the center point of the filter. For example, as shown in FIG. 5, when the filter F5 is at the position P1, the center pixel is IR17 in the RGBIR image. And when the filter F5 is at the position P2, the center pixel is R25 in the RGBIR image. After determining the center pixel, the LUMA value corresponding to the center pixel may be calculated. The way to calculate is to multiply each overlapping pixel in the working field by the coefficient at the corresponding position in the filter to generate a product and sum up all the products in the working field.

For example, when the filter F5 is at the position P1, the center pixel is IR17, and the LUMA value corresponding to IR17 is (0*IR1+1*G2+2*IR3+1*G4+0*IR5+1*G8+4*R9+ 6*G10+4*B11+1*G12+2*IR15+6*G16+8*IR17+6*G18+ 2*IR19+1*G22+4*B23+6*G24+4*R25+1*G26+0*IR29+ 1*G30+2*IR31+1*G32+0*IR33)/64. The LUMA value is the weighted sum of R pixels, G pixels, B pixels and IR pixels. After multiplying the overlapping pixels in the working field by the corresponding coefficients of the filter, a ratio of R pixels, B pixels, IR pixels and G pixels in the working field is a fixed ratio. For example, when the filter F5 is at the position P1 and the center pixel is IR17, the information of R is (4*R9+4*R25)/64=8/64*R=1/8*R; the information of B is (4*B11+4*B23)/64=8/64*B=1/8*B; the information of G is (1*G2+1*G4+1*G8+6*G10+1*G12+6*G16+6*G18+ 1*G22+6*G24+1*G26+1*G30+1*G32)/64=32/64*G=1/ 2*G; and the information of IR is (0*IR1+2*IR3+0*IR5+ 2*IR15+8*IR17+2*IR19+0*IR29+2*IR31+0*IR33)/ 64=16/64*IR=1/4*IR. The ratio of R pixels, B pixels, IR pixels and G pixels in the working field is 1/8:1/8:1/4:1/ 2=1:1:2:4.

In Step S103, the processor determines if all pixels in the RGBIR image are calculated; if not, perform Step 104; if so, perform Step S105. In Step S104, the processor slides the filter to change the center pixel, and then perform S102 to calculate the LUMA value corresponding to the center pixel. When the filter F5 is slide to the position P2, the center pixel is IR25. After multiplying the overlapping pixels in the working field by the corresponding coefficients of the filter F5, the ratio of R pixels, B pixels, IR pixels and G pixels in the working field is still 1/8:1/8:1/4:1/2=1:1:2:4. Regardless of the center pixel is an R pixel, a G pixel, a B pixel or an IR pixel on the RGBIR image, as long as the center point of the filter is on the RGBIR image, the ratio of R pixels, B pixels, IR pixels and G pixels after multiplying the coefficients of the filter by the pixels in the working field is 1:1:2:4 in this embodiment.

Figure 6:
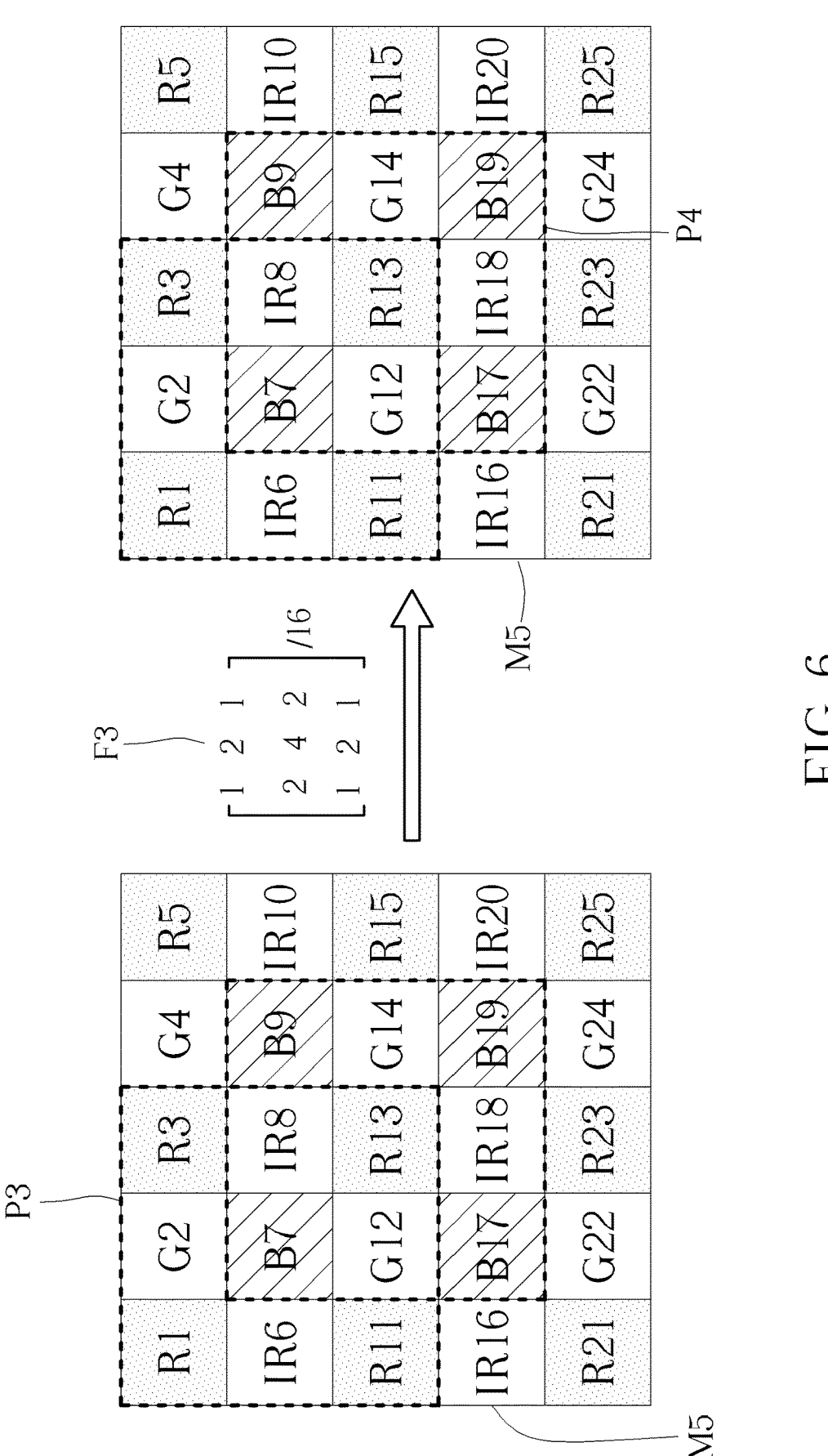
FIG. 6 shows a schematic diagram of overlapping the filter with a 2*2 pattern RGBIR image to define a working field in a 2*2 pattern RGBIR image according to another embodiment of the present invention.

The above description takes a 4*4 pattern RGBIR image as an example, but the present invention is not limited thereto. FIG. 6 shows a schematic diagram of overlapping the filter with a 2*2 pattern RGBIR image to define a working field in a 2*2 pattern RGBIR image according to another embodiment of the present invention. As shown in FIG. 6, The filter F3 is a two-dimensional matrix of size 3*3 and the RGBIR image M5 is a 2*2 pattern RGBIR image. When the processor performs Step S101, overlap the filter F3 with the RGBIR image M5 to define a 3*3 working field in the RGBIR image M5. The working field is the area surrounded by the dotted line. The filter F3 may be slid to change the working field in the RGBIR image M5. After sliding the filter, the center point of the filter F3 is still on the RGBIR image M5.

For example, when the filter F3 is at the position P3, the center pixel is B7, and the LUMA value corresponding to B7 is $(1*R1+2*G2+1*R3+2*IR6+4*B7+2*IR8+1*R11+2*G12+1*R13)/16$. After multiplying the overlapping pixels in the working field by the corresponding coefficients of the filter, a ratio of R pixels, B pixels, IR pixels and G pixels in the working field is a fixed ratio. For example, when the filter F3 is at the position P3 and the center pixel is B7, the information of R is $(1*R1+1*R3+1*R11+1*R13)/16=4/16*R=1/4*R$; the information of B is $(4*B7)/16=4/16*B=1/4*B$; the information of G is $(2*G2+2*G12)/16=4/16*G=1/4*G$; and the information of IR is $(2*IR6+2*IR8)/16=4/16*IR=1/4*IR$. The ratio of R pixels, B pixels, IR pixels and G pixels in the working field is $1/4:1/4:1/4:1/4=1:1:1:1$.

And when the filter F3 is slide to the position P4, the center pixel is R13. After multiplying the overlapping pixels in the working field by the corresponding coefficients of the filter F3, the ratio of R pixels, B pixels, IR pixels and G pixels in the working field is still $1/4:1/4:1/4:1/4=1:1:1:1$. Regardless of the center pixel is an R pixel, a G pixel, a B pixel or an IR pixel on the RGBIR image, as long as the center point of the filter is on the RGBIR image, the ratio of R pixels, B pixels, IR pixels and G pixels after multiplying the coefficients of the filter by the pixels in the working field is 1:1:1:1 in this embodiment.

While specific examples of filters are provided, those skilled in the art would recognize that other filters may be used in the embodiments so long as the ratio of R, B, IR and G after multiplying the coefficients of the filter by the pixels in the working field is a fixed ratio when the filters satisfy the requirements of 1. the filters being two-dimensional matrix of size N*N, N being a positive odd integer, 2. the coefficients of the filter are summed to 1, and 3. when the center point is on the 4*4 pattern RGBIR image or the 2*2 pattern RGBIR image.

Figure 7:
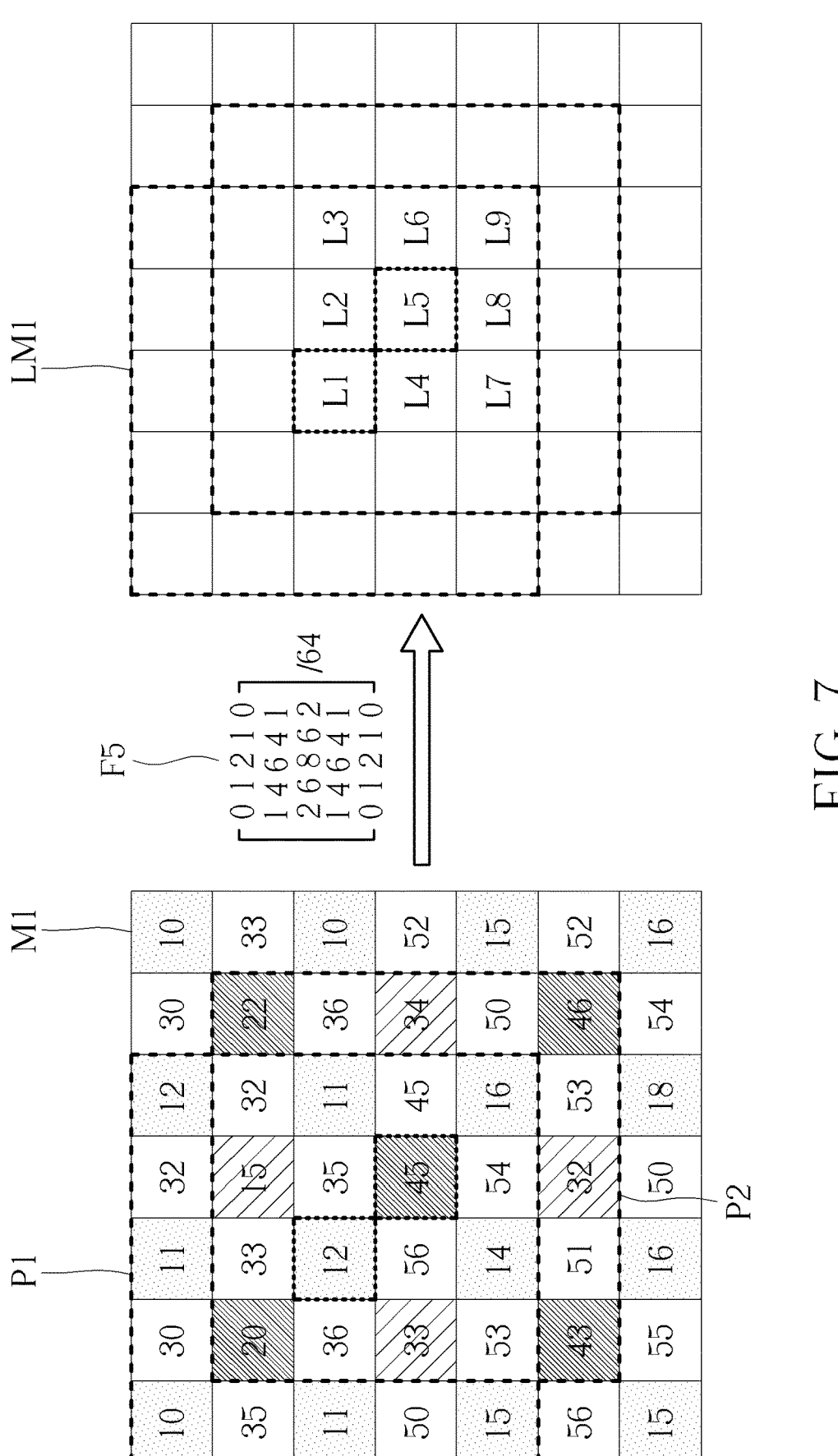
FIG. 7 shows a schematic diagram of calculating the value of LUMA pixels according to another embodiment of the present invention.

Another example of Step S102 to Step S104 may refer to FIG. 7. FIG. 7 shows a schematic diagram of calculating the value of the LUMA pixels according to another embodiment of the present invention. FIG. 7 shows the value of each pixel in M1, and may be used to calculate the values of the LUMA pixels to obtain a LUMA image LM1 by multiplying the value of each pixel with the corresponding coefficient of the filter F5. As mentioned above, when the filter F5 is at the position P1, the LUMA value corresponding to IR17 is $(0*IR1+1*G2+2*IR3+1*G4+0*IR5+1*G8+4*R9+6*G10+4*B11+1*G12+2*IR15+6*G16+8*IR17+6*G18+2*IR19+1*G22+4*B23+6*G24+4*R25+1*G26+0*IR29+1*G30+2*IR31+1*G32+0*IR33)/64$, which is $(0*10+1*30+2*11+1*32+0*12+1*35+4*20+6*33+4*15+1*32+2*11+6*36+8*12+6*35+2*11+1*50+4*33+6*56+4*45+1*45+0*15+1*53+2*14+1*54+0*16)/64=30.203125$. The LUMA value corresponding to IR17 is 30.203125 and the corresponding pixel on the LUMA image LM1 is L1, so the value of L1 is 30.203125. Through iteration, the value of L5 can be calculated when the filter F5 slide to the position P2. The above description takes a 4*4 pattern RGBIR image as an example, but the present invention is not limited thereto. The method of calculating the LUMA value corresponding to each pixel in the 2*2 RGBIR image is similar and will not be described again here.

The processor repeats Step S102 to Step S104 to calculate the LUMA value corresponding to every pixel in the RGBIR image. In Step S105, after the LUMA values corresponding to all pixels in the RGBIR image are calculated, the LUMA image may be obtained, wherein the LUMA image is a full resolution LUMA image. A full resolution LUMA image means the size of the LUMA image is the same as the input image and is not resized. For example, in FIG. 7, the input image is the RGBIR image M1 and the size of M1 is 7*7, so the size of the LUMA image LM1 is also 7*7.

Figure 8:
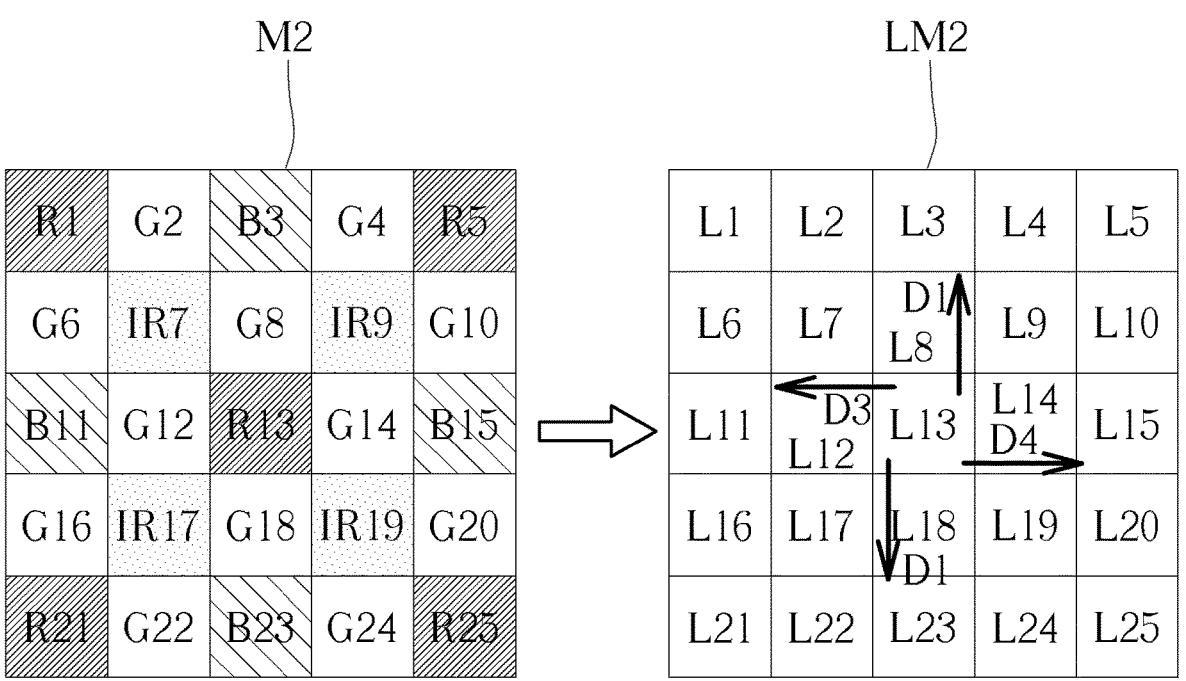
FIG. 8 shows a schematic diagram of calculating gradients according to an embodiment of the present invention.

The example of Step S200 may refer to FIG. 8. FIG. 8 shows a schematic diagram of calculating gradients according to an embodiment of the present invention. By using the LUMA image to calculate the gradients between LUMA pixels at the positions corresponding to the missing pixel and the surrounding pixels, the gradients may be used as a reference for calculating the weight of the missing pixel. For example, the pixel R13 in the RGBIR image M2 is an R pixel, to obtain a complete B-image, a pixel B13 at the position corresponding to the pixel R13 need to be interpolated, that is, the pixel B13 is the missing pixel. To interpolate the pixel B13 at the position corresponding to the pixel R13, the LUMA image LM2 generated according to the RGBIR image M2 may be used to calculate the gradients between the LUMA pixel L13 and the surrounding LUMA pixels L8, L18, L12, L14, that is, to calculate the gradients D1, D2, D3, D4 between the LUMA pixel L13 and the surrounding pixels L8, L18, L12, L14 on the LUMA image LM2. The gradient may be the absolute value of the differences between the LUMA pixel L13 and the value of the surrounding LUMA pixels L8, L18, L12, L14, but not limited thereto. For example, the gradient D1 may be $1/|L13-L8|$, the gradient D2 may be $1/|L13-L18|$, the gradient D3 may be $1/|L13-L12|$ and the gradient D4 may be $1/|L13-L14|$. In some embodiments, the number of gradients may be different and is at least two.

In Step S300, after calculating the gradients, the processor interpolates the missing pixel between the same types of pixels in the RGBIR image according to the gradients. The two pixels in the RGBIR image are the same type of pixels with the missing pixel. For example, the pixel B3, the pixel B11, the pixel B15 and the pixel B23 are the same type of pixels with the pixel B13. The missing pixel is interpolated according to the same type of pixels and the gradients. For example, the pixel B13 is interpolated according to the pixel B3, the pixel B11, the pixel B15, the pixel B23, and the gradient D1-D4. The value of the missing pixel may be the sum of the same type of pixels multiplied by the weights. The weights may be calculated according to the gradients. For example, the weight W1 may be $D1/(D1+D2+D3+D4)$, the weight W2 may be $D2/(D1+D2+D3+D4)$, the weight W3 may be $D3/(D1+D2+D3+D4)$ and the weight W1 may be $D4/(D1+D2+D3+D4)$. The value of the pixel B13 maybe $B13=W1*B3+W2*B23+W3*B11+W4*B15$. The calculation of the weights and the value of the missing pixel are not limited thereto. In some embodiments, the number of the same type of pixels may be different and is at least two.

In Step S400, after interpolating all missing pixels, obtain an interpolated image. The interpolated image may be an R-image, G-image, B-image and IR-image, or a color filter array (CFA) raw image. The CFA raw image may be a Bayer pattern RGB raw image, but not limited thereto. By using the LUMA image, gradients can be calculated to assist interpolation and the artifact may be reduced.

Figure 9:
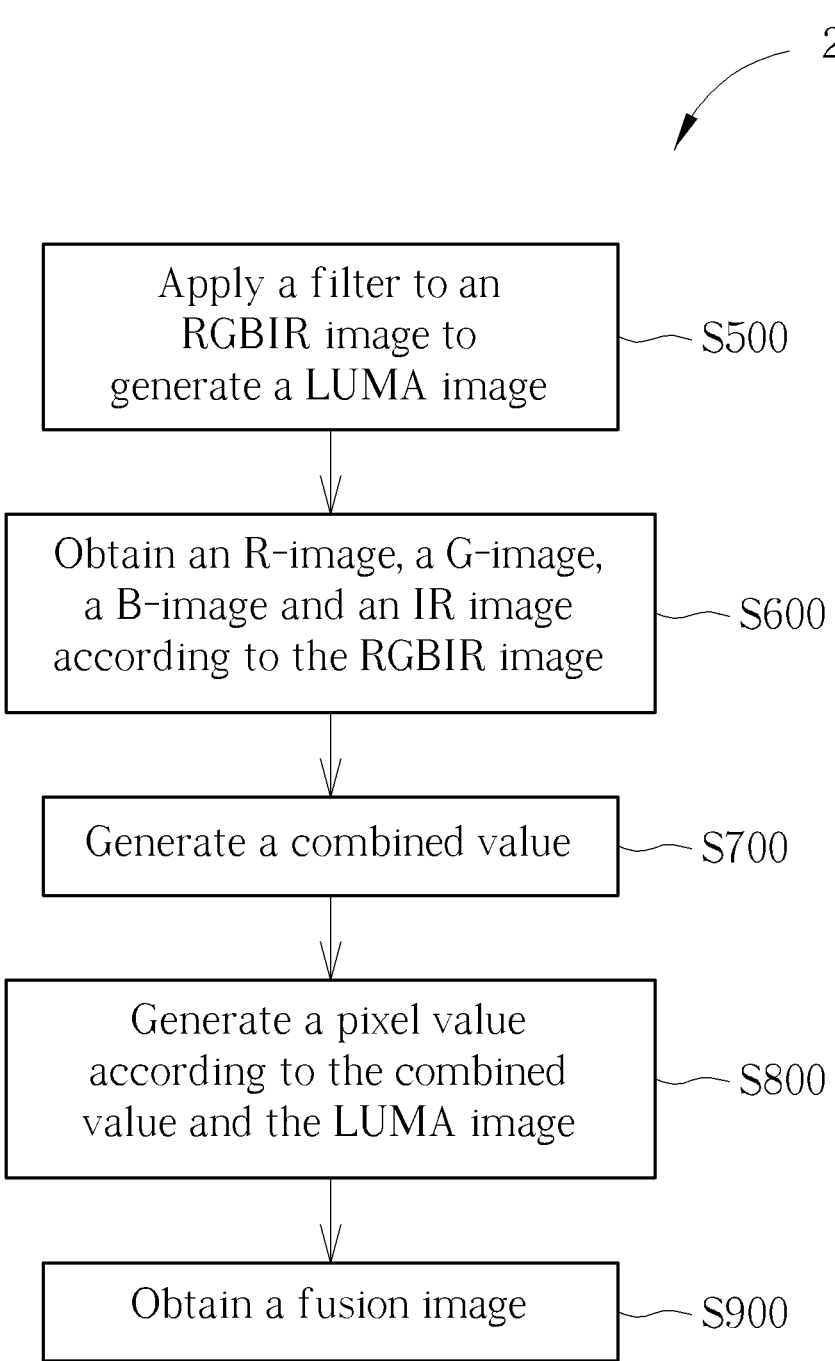
FIG. 9 shows a flowchart of an image fusion method according to an embodiment of the present invention.

FIG. 9 shows a flowchart of an image fusion method 2 according to an embodiment of the present invention. The image fusion method 1 includes Steps S500 to S900. Any reasonable step change or adjustment is within the scope of the disclosure. Steps S500 to S900 are explained as follows:

Step S500: Apply a filter to an RGBIR image to generate a LUMA image;

Step S600: Obtain an R-image, a G-image, a B-image and an IR image according to the RGBIR image;

Step S700: Generate a combined value;

Step S800: Generate a pixel value according to the combined value and the LUMA image;

Step S900: Obtain a fusion image.

Step S500 is similar to Step 100 in the image interpolation method 1 and will not be described again here. In Step S600, the R-image, the G-image, the B-image or the IR image may be interpolated according to the RGBIR image and may be interpolated by, but is not limited to, the image interpolation method 1.

Figure 10:
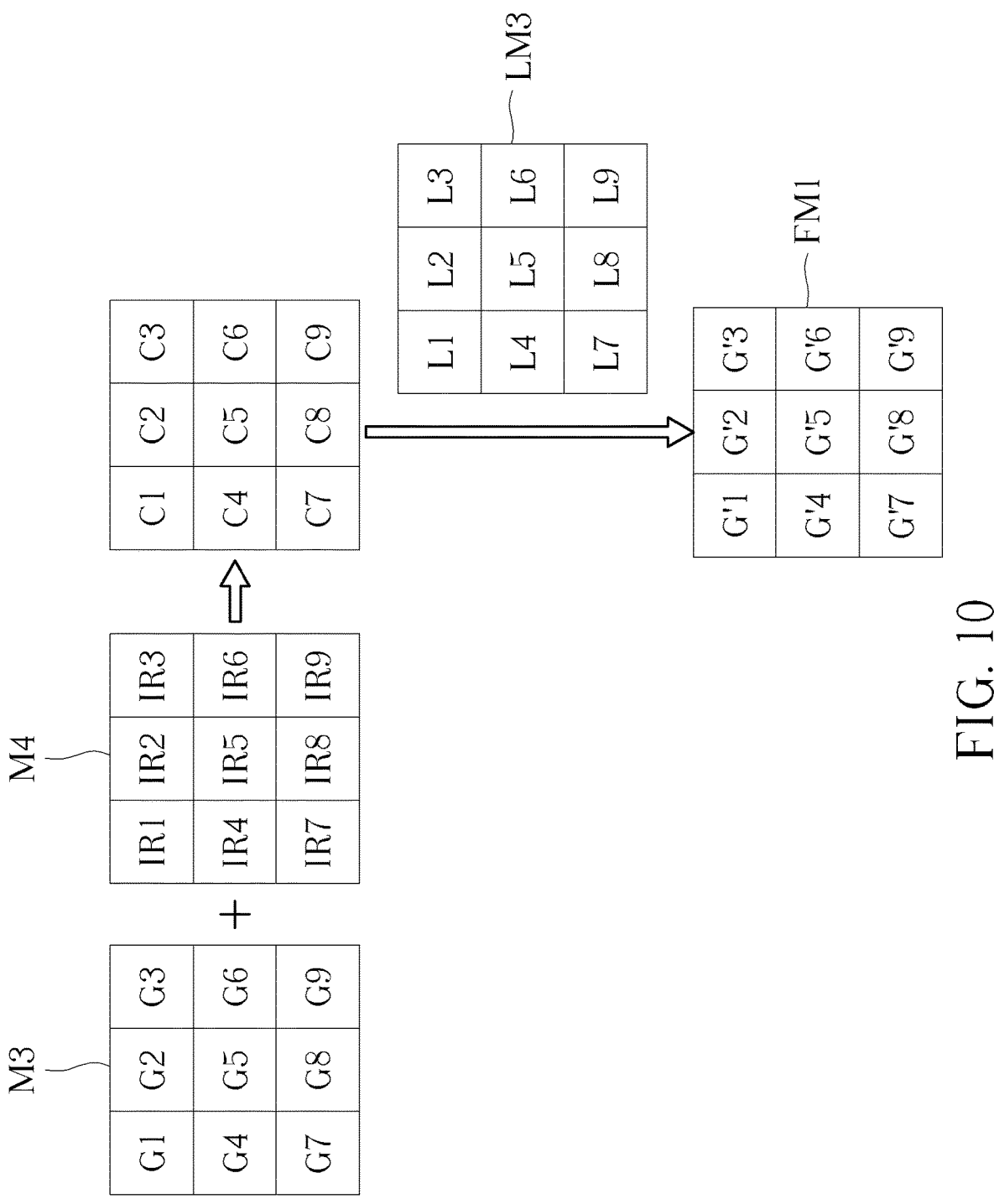
FIG. 10 shows a schematic diagram of image fusion according to an embodiment of the present invention.

Step S700 to Step S900 are steps to generate a fusion image according to the R-image, G-image, B-image, the IR image and the LUMA image. The example of Step S700 to Step S900 may refer to FIG. 10. FIG. 10 shows a schematic diagram of image fusion according to an embodiment of the present invention. In Step S700, the processor combines the pixel value of a pixel in the R-image, the G-image or the B-image and the pixel value of a corresponding pixel in the IR image to generate a combined value. The combined value is generated according to a fusion weight. The fusion weight is calculated according to the pixel value of the pixel in the R-image, the G-image or the B-image and the pixel value of the corresponding pixel in the IR image. For example, in FIG. 10, combine the pixel value of a pixel G1 in the G-image M3 and the pixel value of a corresponding pixel IR1 in the IR image M4 to generate a combined value C1. The combined value C1 may be G1+W5*IR1, wherein W5 is the fusion weight, and the fusion weight W5 may be IR1/(IR1+G1), but not limited thereto.

In Step S800, the processor generates a pixel value of a corresponding pixel in the fusion image according to the combined value and a corresponding pixel in the LUMA image. The LUMA image is taken as a reference in image fusion. If the combined value exceeds an upper limit, the pixel value of the corresponding pixel in the fusion image is set to the upper limit; if the combined value is less than a lower limit, the pixel value of the corresponding pixel in the fusion image is set to the lower limit. The upper limit and the lower limit are defined according to the corresponding pixel in the LUMA image. For example, in FIG. 10, generate the pixel value G'1 of a corresponding pixel in the fusion image FM1 according to the combined value C1 and a corresponding pixel L1 in the LUMA image LM3. If the combined value C1 exceeds the upper limit L1*1.5, the pixel value G'1 is set to the upper limit L1*1.5; if the combined value C1 is less than the lower limit L1*0.5, the pixel value G'1 is set to the lower limit L1*0.5; otherwise, the pixel value G'1 is set to the combined value C1. In Step S900, after setting all pixel value in the fusion image FM1, a complete fusion image LM1 may be obtained. After obtaining a complete fusion R-image, a complete fusion G-image and a complete fusion B-image, a complete fusion RGB-image may be obtained. The image fusion method 2 may also obtained a color filter array (CFA) raw image by obtaining a RGB image and an IR image in Step S600, and not limited thereto.

Since the LUMA image in the image fusion method 2 is obtained from the RGBIR image by using the proposed filter, the LUMA image contains both RGB and IR information, which makes the LUMA image a better reference of fusion weight calculation in image fusion.

Figure 11:
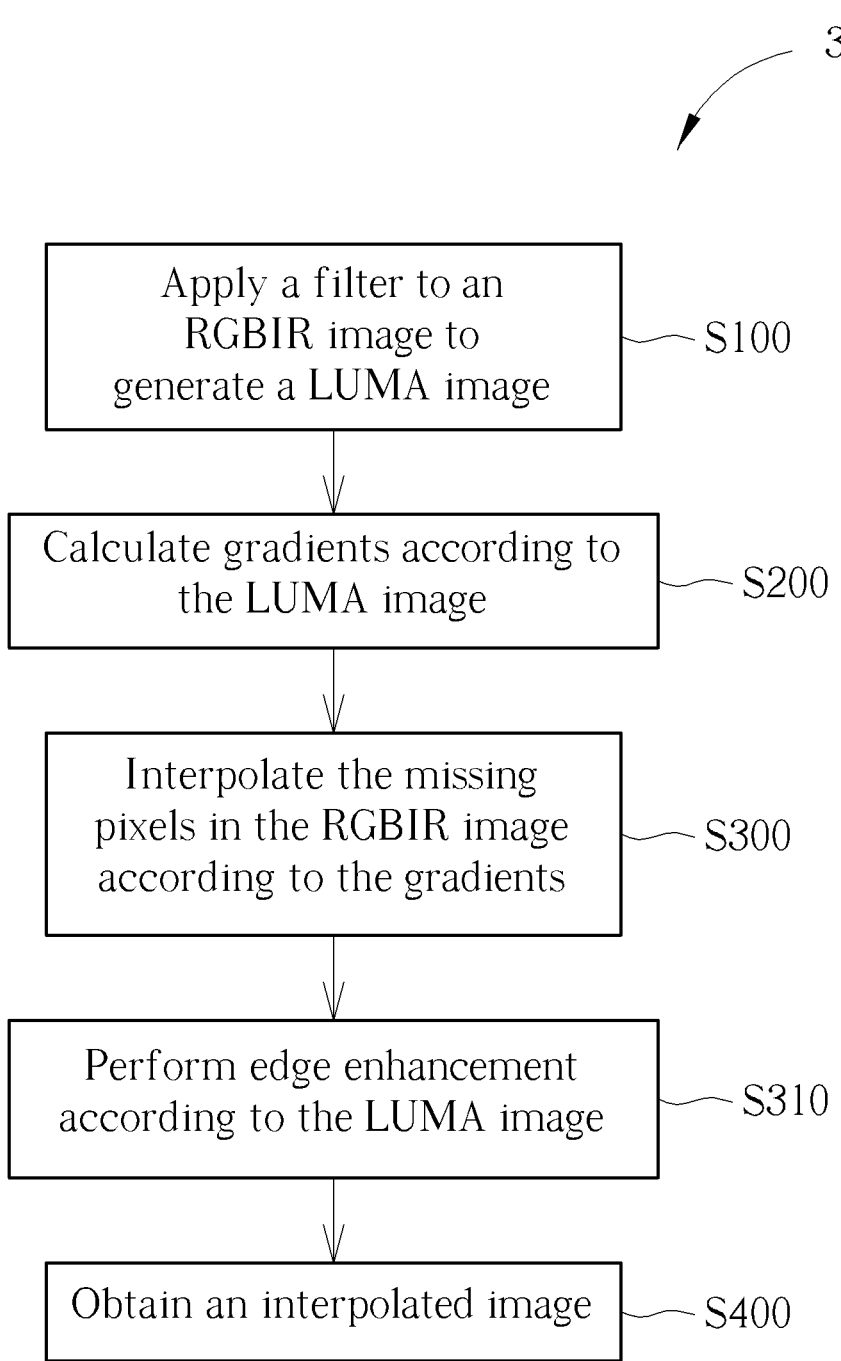
FIG. 11 shows a flowchart of an edge enhancement method according to an embodiment of the present invention.

FIG. 11 shows a flowchart of an edge enhancement method 3 according to an embodiment of the present invention. The edge enhancement method 3 includes Steps S100 to S400. Any reasonable step change or adjustment is within the scope of the disclosure. Steps S100 to S400 are explained as follows:

Step S100: Apply a filter to an RGBIR image to generate a LUMA image;

Step S200: Calculate gradients according to the LUMA image;

Step S300: Interpolate the missing pixels in the RGBIR image according to the gradients;

Step S310: Perform edge enhancement according to the LUMA image;

Step S400: Obtain an interpolated image.

The edge enhancement method 3 builds upon the image interpolation method 1. Step S100, Step S200, Step S300 and Step S400 are similar to the image interpolation method 1. The difference between the edge enhancement method 3 and the image interpolation method 1 is Step S310 between Step S300 and Step S400. In Step S310, the LUMA image obtained in Step S100 may be a reference for performing edge enhancement. Edge enhancement is to enhance the edge contrast of an image to improve its apparent sharpness. Contrast is the difference in brightness between objects or regions. With the LUMA image, the information of the brightness of both the visible light (RGB) and the near-infrared light (IR) may be obtained. When the edge contrast is low (e.g., less than a brightness threshold), the gradient calculated in Step S300 may be used as a reference to adjust the value of the pixel to enhance the contrast.

Figure 12:
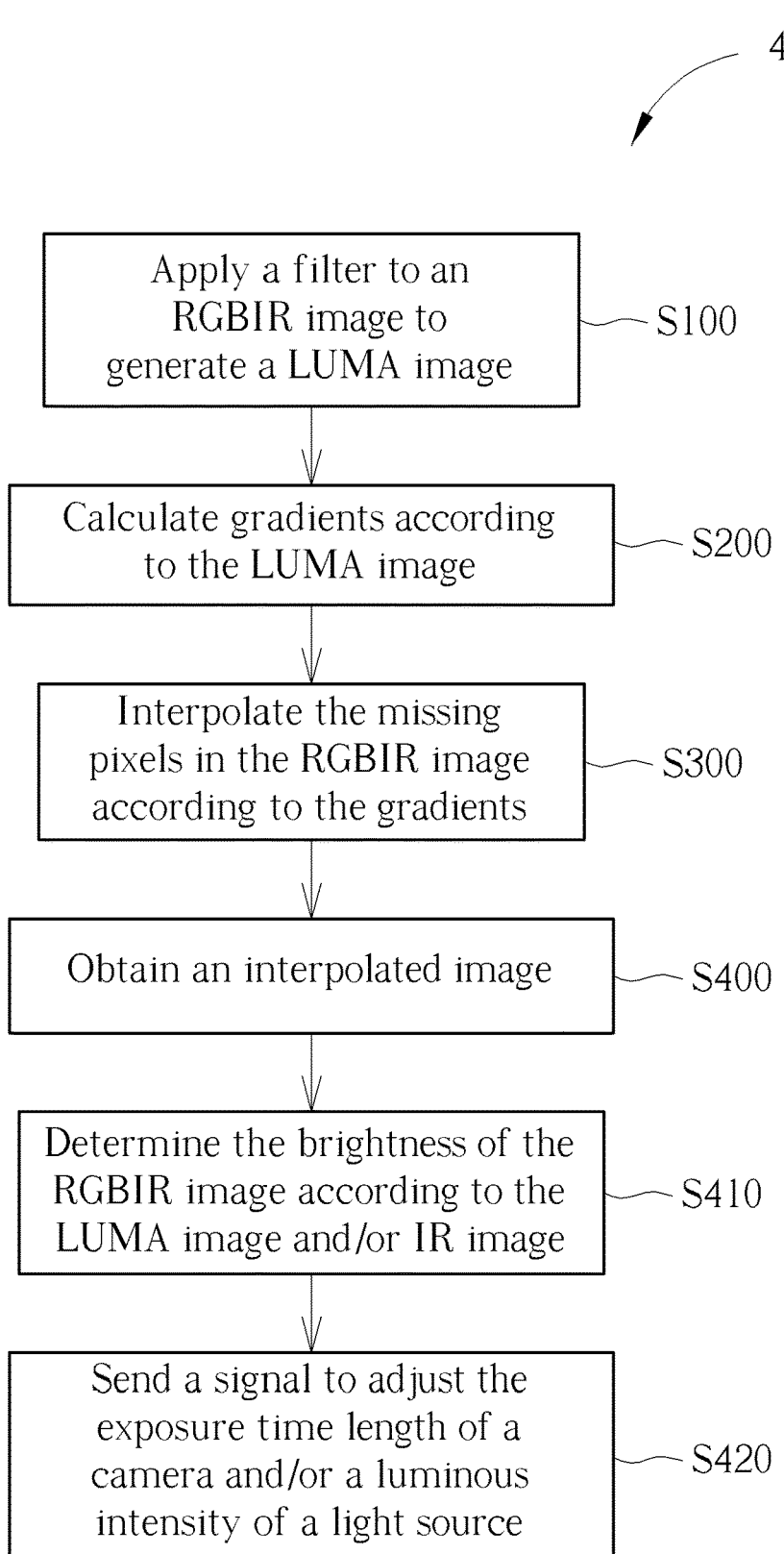
FIG. 12 shows a flowchart of a brightness adjustment method according to an embodiment of the present invention.

FIG. 12 shows a flowchart of a brightness adjustment method 4 according to another embodiment of the present invention. The brightness adjustment method 4 includes Steps S100 to S420. Any reasonable step change or adjustment is within the scope of the disclosure. Steps S100 to S420 are explained as follows:

Step S100: Apply a filter to an RGBIR image to generate a LUMA image;

Step S200: Calculate gradients according to the LUMA image;

Step S300: Interpolate the missing pixels in the RGBIR image according to the gradients;

Step S400: Obtain an interpolated image;

Step S410: Determine the brightness of the RGBIR image according to the LUMA image and/or IR image;

Step S420: Send a signal to adjust the exposure time length of a camera and/or a luminous intensity of a light source.

The brightness adjustment method 4 is another application of the image interpolation method 1. Step S100 to Step S400 are similar to the image interpolation method 1. The difference between the brightness adjustment method 4 and the image interpolation method 1 is Step S410 and Step S420.

Figure 13:
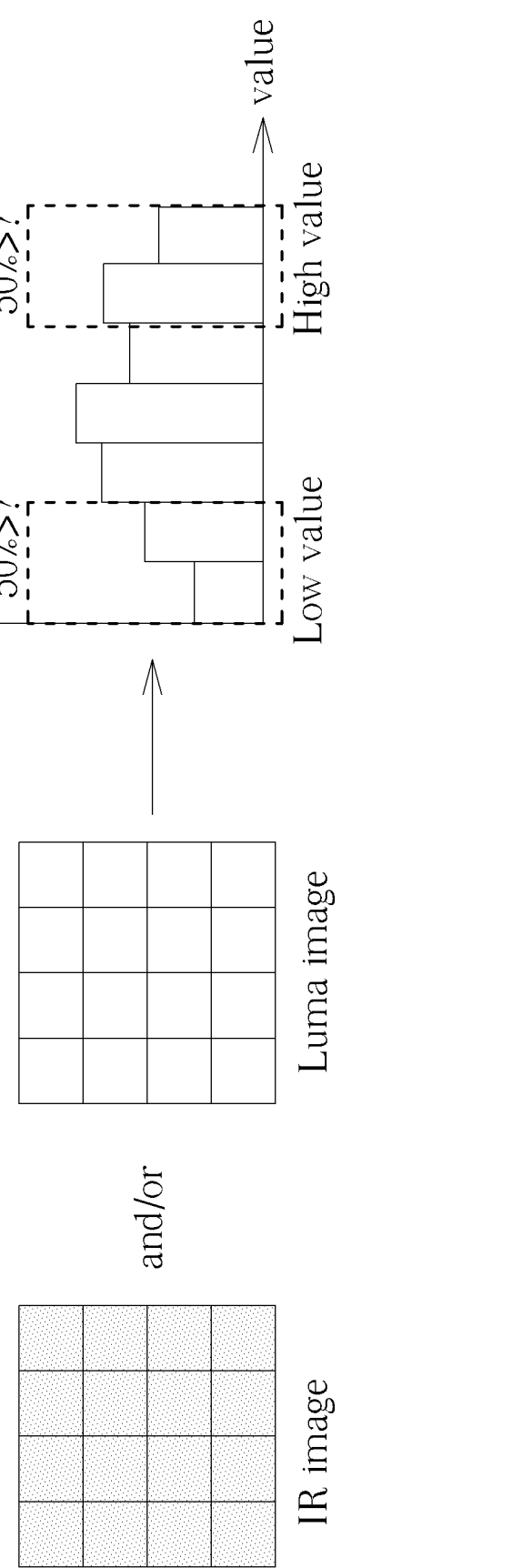
FIG. 13 shows a schematic diagram of determining the brightness according to the LUMA image and/or the IR image.

In Step S410, the brightness of the RGBIR image is determined according to the LUMA image and/or IR image obtained in Step S400. FIG. 13 shows a schematic diagram of determining the brightness according to the LUMA image and/or IR image. The pixels in the LUMA image and/or the IR image may be represented as a histogram. The value of an IR pixel and/or a LUMA pixel may indicate if the pixel is in a high-brightness area or a low-brightness area. If the number of pixels in the high-brightness area is higher than 50%, the brightness of the light source is determined to be reduced. If the number of pixels in the low-brightness area is higher than 50%, the brightness of the light source is determined to be increased. Then in Step S420, the processor sends a signal to adjust the exposure time length of the camera and/or the luminous intensity of the light source to reduce or increased the brightness of the light source. The light source may be a backlight module of a liquid crystal display. In some embodiments, when the brightness of the RGBIR image is determined according to only the LUMA image, Step S410 and Step S420 may be performed before Step S200.

By using the method of the present invention, a LUMA image may be obtained with a very low number of calculations, and each LUMA pixel in the LUMA image contains a fixed ratio of R pixels, B pixels, IR pixels and G pixels. By using the LUMA image, gradients may be calculated to assist interpolation, reducing artifact while sharpening the image edges. The LUMA image may also be used as a reference when performing image fusion. Since the LUMA image includes both RGB and IR information, a better fusion weight may be calculated and the brightness of the output image may be controlled.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image interpolation method comprising:
applying a filter to an RGBIR image to generate a LUMA image directly from the RGBIR image;
calculating two gradients according to the LUMA image, each gradient corresponding to two LUMA pixels in the LUMA image; and
interpolating a missing pixel between two pixels in the RGBIR image according to the two gradients to generate an interpolated image, wherein the interpolated image is an R-image, G-image, B-image and IR image, or a color filter array (CFA) raw image; and
generating a fusion image according to the R-image, the G-image, the B-image, the IR image and the LUMA image.

2. The method of claim 1, wherein the two pixels in the RGBIR image are the same type of pixels.

3. The method of claim 1, further comprising:
performing an edge enhancement according to the LUMA image.

4. The method of claim 1, further comprising:
determining a brightness of the RGBIR image according to the LUMA image and/or IR image; and
sending a signal to adjust an exposure time length of a camera.

5. The method of claim 1, further comprising:
determining a brightness of the RGBIR image according to the LUMA image and/or IR image; and
sending a signal to adjust a luminous intensity of a light source.

6. The method of claim 1, wherein the LUMA image is a full resolution LUMA image.

7. The method of claim 1, wherein:
the filter is a two-dimensional matrix of (N*N) coefficients, N being a positive odd integer; and
a sum of coefficients of the two-dimensional matrix is 1.

8. The method of claim 7, wherein applying the filter to the RGBIR image to generate the LUMA image directly from the RGBIR image comprises:
overlapping the filter with the RGBIR image to define a working field in the RGBIR image; and
wherein when a center point of the filter is on the RGBIR image, after multiplying an overlapping pixel in the working field by a corresponding coefficient of the filter, a ratio of R pixels, B pixels, IR pixels and G pixels in the working field is a fixed ratio.

9. An image fusion method comprising:
applying a filter to an RGBIR image to generate a LUMA image;
obtaining an R-image, a G-image, a B-image and an IR image according to the RGBIR image; and
generating a fusion image according to the R-image, the G-image, the B-image, the IR image and the LUMA image;
wherein generating the fusion image comprises:
combining a pixel value of a pixel in the R-image, the G-image or the B-image and a pixel value of a corresponding pixel in the IR image to generate a combined value; and
generating a pixel value of a corresponding pixel in the fusion image according to the combined value and a corresponding pixel in the LUMA image.

10. The method of claim 9, wherein generating the pixel value of the corresponding pixel in the fusion image according to the combined value and the corresponding pixel in the LUMA image comprises:
if the combined value exceeds an upper limit, setting the pixel value of the corresponding pixel in the fusion image to the upper limit, wherein the upper limit is defined according to the corresponding pixel in the LUMA image.

11. The method of claim 9, wherein generating the pixel value of the corresponding pixel in the fusion image according to the combined value and the corresponding pixel in the LUMA image comprises:
if the combined value is less than a lower limit, setting the pixel value of the corresponding pixel in the fusion image to the lower limit, wherein the lower limit is defined according to the corresponding pixel in the LUMA image.

12. The method of claim 9, wherein combining the pixel value of the pixel in the R-image, the G-image or the B-image and the pixel value of the corresponding pixel in the IR image to generate the combined value comprises:
calculating a weight according to the pixel value of the pixel in the R-image, the G-image or the B-image and the pixel value of the corresponding pixel in the IR image; and
generating the combined value according to the weight.

13. The method of claim 9, further comprising:
determining a brightness of the RGBIR image according to the LUMA image and/or IR image; and
sending a signal to adjust an exposure time length of a camera.

14. The method of claim 9, further comprising:
determining a brightness of the RGBIR image according to the LUMA image and/or IR image; and
sending a signal to adjust a luminous intensity of a light source.

15. The method of claim 9, wherein the LUMA image is a full resolution LUMA image.

16. The method of claim 9, wherein:
the filter is a two-dimensional matrix of (N*N) coefficients, N being a positive odd integer; and
a sum of coefficients of the two-dimensional matrix is 1.

17. The method of claim 16, wherein applying the filter to the RGBIR image to generate the LUMA image comprises:
overlapping the filter with the RGBIR image to define a working field in the RGBIR image; and
wherein when a center point of the filter is on the RGBIR image, after multiplying an overlapping pixel in the working field by a corresponding coefficient of the filter, a ratio of R pixels, B pixels, IR pixels and G pixels in the working field is a fixed ratio.

\* \* \* \* \*